United States Patent
Oishi et al.

(10) Patent No.: US 6,530,535 B2
(45) Date of Patent: Mar. 11, 2003

(54) FISHING REEL

(75) Inventors: Harumichi Oishi, Tokyo (JP); Masashi Ono, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 20 days.

(21) Appl. No.: 09/809,270

(22) Filed: Mar. 16, 2001

(65) Prior Publication Data

US 2001/0038052 A1 Nov. 8, 2001

(30) Foreign Application Priority Data

Mar. 16, 2000 (JP) ........................................ 2000-073422
May 11, 2000 (JP) ........................................ 2000-137931

(51) Int. Cl.$^7$ .............................................. A01K 89/02
(52) U.S. Cl. ........................ 242/295; 242/293; 242/300
(58) Field of Search ................................ 242/259, 262, 242/264, 293, 295, 301, 302, 300

(56) References Cited

U.S. PATENT DOCUMENTS

| | | | | |
|---|---|---|---|---|
| 5,285,985 A | * | 2/1994 | Sakaguchi | 242/299 |
| 5,322,240 A | * | 6/1994 | Sato | 242/295 |
| 5,588,605 A | * | 12/1996 | Yamaguchi | 242/268 |
| 5,918,825 A | * | 7/1999 | Hlrano et al. | 242/247 |
| 6,254,021 B1 | * | 7/2001 | Morimoto et al. | 188/181 A |
| 6,354,526 B1 | * | 3/2002 | Morise | 242/295 |

FOREIGN PATENT DOCUMENTS

| | | | | |
|---|---|---|---|---|
| JP | 5-68453 | * | 3/1993 | 242/262 |
| JP | 5-68454 | * | 3/1993 | 242/262 |
| JP | 2515035 | | 8/1996 | A01K/89/033 |
| JP | 9-168354 | | 6/1997 | A01K/89/015 |

* cited by examiner

*Primary Examiner*—Emmanuel Marcelo
(74) *Attorney, Agent, or Firm*—Sughrue Mion, PLLC

(57) ABSTRACT

A hollow (3h) and a plurality of grooves (3j) are formed in a support portion (3g) of a side frame (3). A collar (8) is fit to the support portion in a state that it is axially movable but it is locked in its rotation. Gaps (a, b) are provided within the hollow (3h), while being positioned a distance apart in the axial direction of the collar (8). Elastic rings (29) and (30) each made of felt or soft rubber are placed within the gaps (a, b), respectively.

A rotary member (15) and an inner ring (39) are fit to the handle drive shaft (7), and an adjusting member (40) is screw coupled to the handle drive shaft (7).

An outer ring (9) of a one-way clutch (D) of a rolling type is inserted and fixed to a tubular portion (8a) of the collar (8). A holder (41) and bar-like rolling members (42) are disposed within the outer ring (9) of the one-way clutch (D). An inner surface (9a) of the outer ring (9) includes a free rotation area ($\alpha$) which is shaped to be concave and allows the bar-like rolling member (42) to rotate thereon, and a stopping surface ($\beta$) which stops the rotation of the bar-like rolling member (42) when it is brought into contact therewith.

14 Claims, 8 Drawing Sheets

FISHING REEL

BACKGROUND OF THE INVENTION

1. Field of the Invention

The present invention relates to improvement of a fishing reel in which a friction coupling force of a rotary body, e.g., drive gear, which is friction coupled to a drive shaft that is rotated interlocking with a handle, is controlled in magnitude by an adjusting member through an action of a rolling type one-way clutch.

2. Related Art

A reverse rotation preventing structure is generally used in which a spool rotated when a fishing line is played out and a ratchet wheel are locked by a pawl when those are rotated in the reverse direction. The structure is problematic in that an angle of play of reverse rotation is large and hence the structure cannot quickly stop the reverse rotation of those rotary components.

The reverse rotation preventing device for the fishing reel as disclosed in Japanese Patent Publication Hei. 9-168354A is widely, rather, predominantly used in this field. In the device, a rolling type one-way clutch is provided between a drive shaft and a reel body, and a play of reverse rotation is lessened by the utilization of a wedging action of the one-way clutch.

The reverse rotation preventing device based on the one-way clutch utilizes a wedging action of the rolling member on the outer surface of the drive shaft (the outer surface of the inner ring rotating together with the drive shaft) . The reverse rotation preventing device is advantageous in that the play in the reverse rotation is lessened. In the reverse rotation preventing device, during the fighting with a fish, a tension acts on the line, and a load torque having a reverse direction acts on the one-way clutch through the drive shaft being rotated interlocking with the spool.

At this time, to prevent the drive shaft from being rotated in the reverse direction, the rolling members of the one-way clutch are locked through a wedging action on the outer surface of the inner ring that is fit to the outer surface of the drive shaft in a state that it is locked in its rotation.

A rotary body (drive gear) that is rotated when the line is played out is friction coupled to the drive shaft by a brake device. Through a rotation of an adjusting member screw coupled to the drive shaft, an inner ring that is fit to the drive shaft such that it is axially movable while being locked in its rotation, is moved to the inner side. As a result, a friction coupling force is adjusted in accordance with a current situation, thereby preventing line cutting, the fish's mouth cut and the like.

However, the following problem of the reverse rotation preventing device remains unsolved. Even if, under the tension during the fighting with the fish, the angler releases the adjusting member in a brake mechanism to weaken the friction coupling force of the rotary body, the inner ring on the drive shaft does not follow up the adjusting member and hence does not move in the pressing-force removing direction since the rolling members of the one-way clutch fixed to the support portion of the reel body are locked, through the wedging action, on the outer surface of the inner ring on the drive shaft. Accordingly, the fishing .reel fails to weaken the friction coupling force of the rotary body, that is, a braking force of the spool, and hence a braking action is uncontrollable. As a result, trouble such as line cutting, the fish's mouth cut or the like will occur. Through the rotation of the handle, the locking state is removed, a braking state of the brake is abruptly shifted to a weak braking state, thereby causing a backlash.

SUMMARY OF THE INVENTION

Accordingly, an object of the present invention is to provide a fishing reel which is able to adjust a friction coupling force of a rotary body in a state that the rolling members in a one-way clutch of a rolling type are locked, and is free from the backlash caused by the rotation of the handle.

To achieve the above object, according to a first aspect. of the invention, there is provided a fishing reel comprising:

a reel body;

a driving shaft which is rotatably supported with the reel body and is rotated by a rotation of a handle;

a rotary body frictionally coupled to one end of the driving shaft, the rotary body being rotated when a fishing line is played out;

an adjusting member, for adjusting a friction coupling force of the rotary body in magnitude, mounted on the other end of the driving shaft, the adjusting member being axially movable with respect to the driving shaft; and a rolling type one-way clutch, for preventing the driving shaft from rotating in a reverse direction, provided at a portion of the driving shaft between the rotary body and the adjusting member, the rolling type one-way clutch including, an inner ring rotatable together with and slidable along the driving shaft, the inner ring being brought into contact with at least one rolling member of the rolling type one-way clutch, wherein the friction coupling force of the rotary body is adjustable by sliding the inner ring along the driving shaft, an outer ring fit to a support portion the reel body so that the outer ring is locked in its rotation so that the at least one rolling member is putted between the inner ring and the outer ring, and a gap for allowing a movement of at least one part of the rolling type one-way clutch in the axial direction.

With such a construction, when to fight with a fish, an angler plays out the line while braking the spool, even if, under the reverse rotation load during the playing out of the fishing line, the angler adjusts the spool braking force to cope with a momently changing fighting situation, and the bar-like rolling member of the one-way clutch, which forms reverse rotation preventing device, and the inner ring on the handle drive shaft are locked by the load and the wedging action during the reverse rotation, the braking operation 1s adjusted while free from its locking because of a freedom of the movement resulting from the axial movement of the one-way clutch, and prevention of a trouble caused by improper spool braking force adjustment, which will occur during the actual fishing, is secured.

According to a second aspect of the invention, in the fishing reel of the first aspect, the gap is provided between the outer ring and the support portion.

According to a third aspect of the invention, in the fishing reel of the second aspect, an elastic ring made of felt or soft rubber is inserted into the gap.

According to a forth aspect of the invention, in the fishing reel of the first aspect, the gap is provided between the outer ring and the at least one rolling member.

According to a fifth aspect of the invention, in the fishing reel of the forth aspect, an elastic ring made of felt or soft rubber is inserted into the gap.

According to a sixth aspect of the invention, in the fishing reel of the forth aspect, a spring is inserted into the gap.

According to a seventh aspect of the invention, in the fishing reel of the first aspect, the gaps are provided-at opposite sides of the rolling type one-way clutch.

According to a eighth aspect of the invention, there is provided a fishing reel comprising:

a reel body;

a spool for holding a fishing line wound thereon rotatably supported between side plates of the reel body;

a handle rotatably supported with the reel body;

a handle shaft rotating with the handle rotatably supported with the reel body;

a take-up drive mechanism which transmits a rotating operation of the handle to the spool for wounding the fishing line thereon;

a drag mechanism, for allowing the spool to rotate in a direction of playing out the fishing line with a dragging force in a fishing line take-up state, provided between the spool and the handle;

an operating portion rotatably supported with the handle shaft so that a movement to an axial direction of the operating portion is prohibit; and a drag pressing portion coupled to the operating portion, wherein the dragging force of the drag mechanism is adjusted by moving forward and backward the drag pressing portion in accordance with a quantity of operation of the operating portion.

According to a ninth aspect of the invention, in the fishing reel of eighth aspect, the fishing reel further comprising a one-way clutch provided on the handle shaft.

According to a tenth aspect of the invention, in the fishing reel of the ninth aspect, the drag pressing portion serves as an inner ring of the one-way clutch.

According to a eleventh aspect of the invention, in fishing reel of the eighth aspect, the drag pressing portion is in a tubular shape into which the handle shaft is inserted.

According to a twelfth aspect of the invention, in the fishing reel of the eighth aspect, the drag mechanism is coupled to one end of the handle shaft, the handle and the operating portion are coupled to the other end of the handle shaft.

According to a thirteenth aspect of the invention, in the fishing reel o the eighth aspect, a distance between the handle and the operating portion in the axial direction is constant when the operating portion is operated for adjusting the dragging force.

DESCRIPTION OF THE PREFERRED EMBODIMENTS

Figure 1:
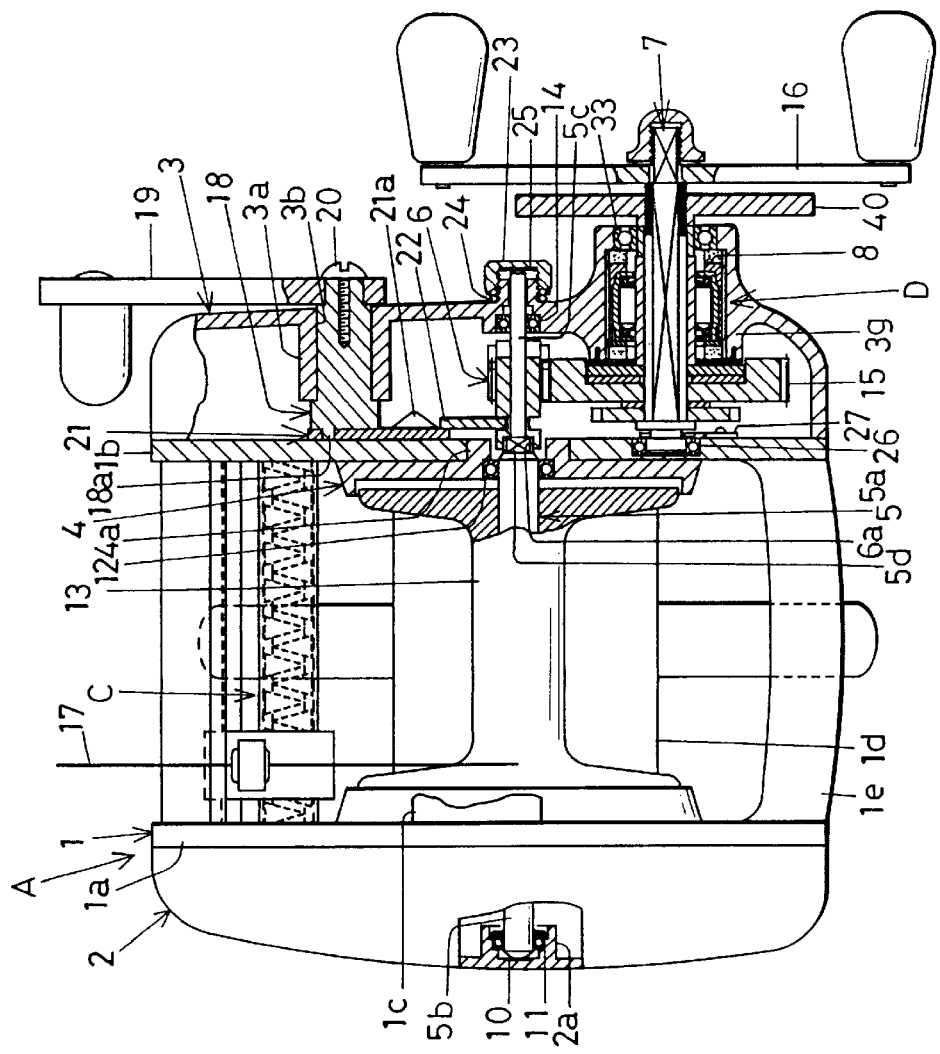
FIG. 1 is a plan view showing, partly in cross section, a major portion of a fishing double-bearing reel.
Figure 2:
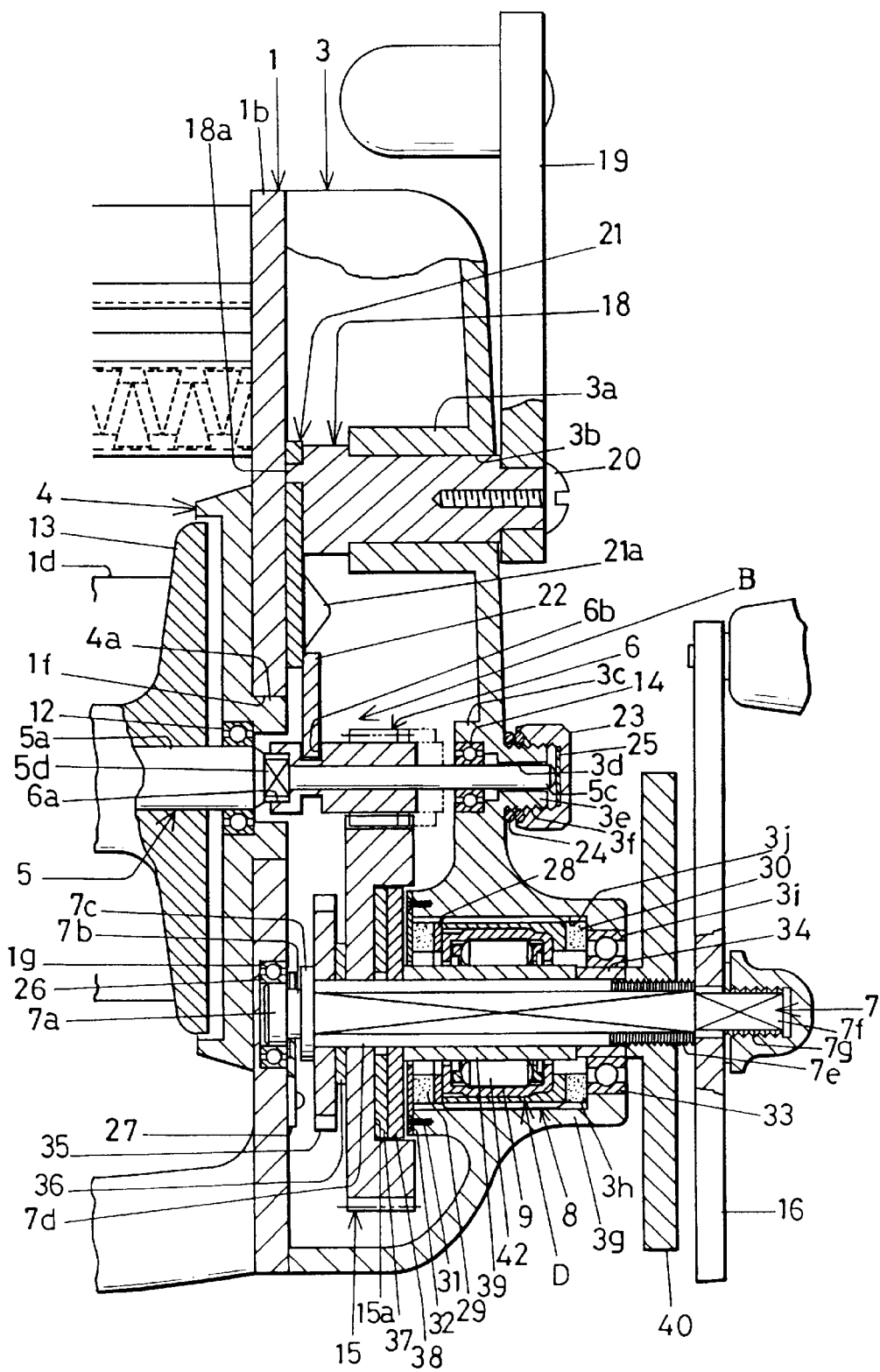
FIG. 2 is an enlarged, cross sectional view showing a portion including a handle and its near structure in the fishing double-bearing reel.
Figure 3:
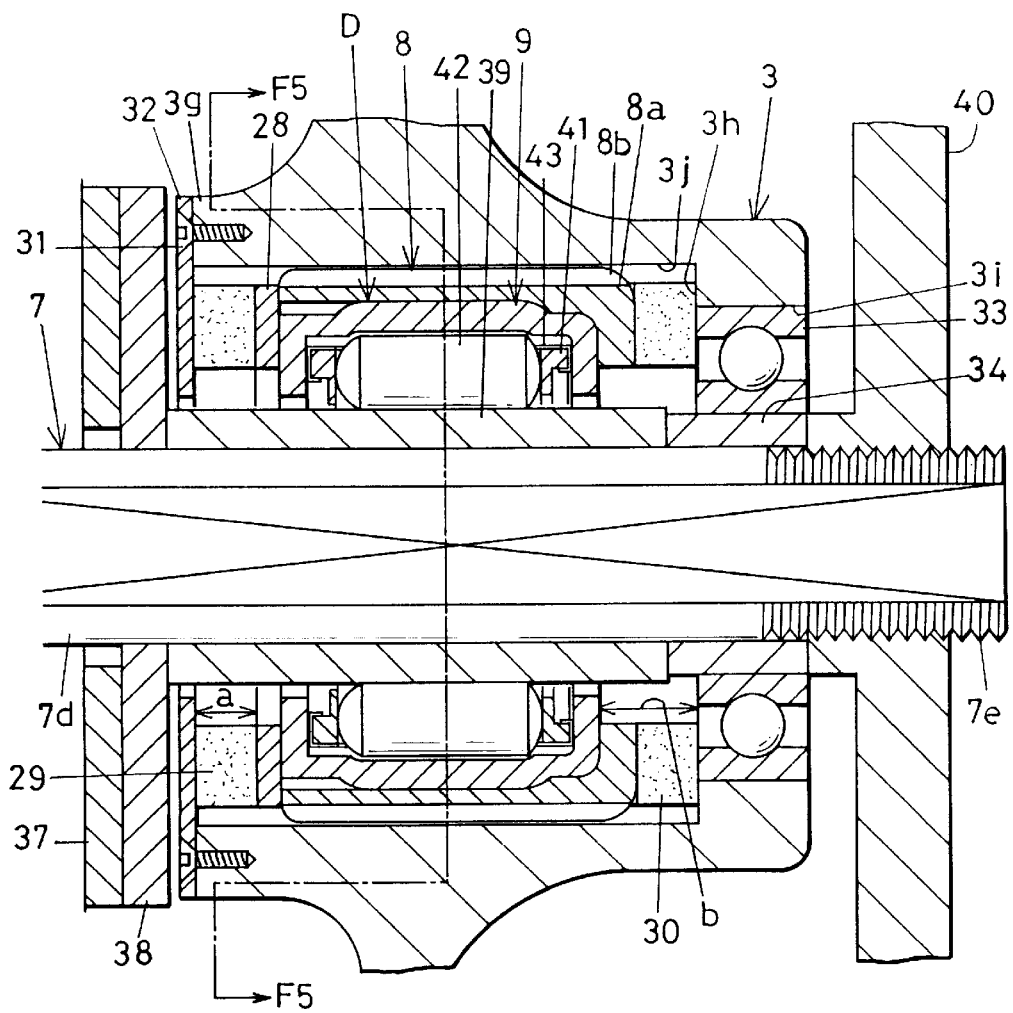
FIG. 3 is an enlarged, cross sectional view showing a structure including a handle drive shaft in the double-bearing reel.
Figure 4:
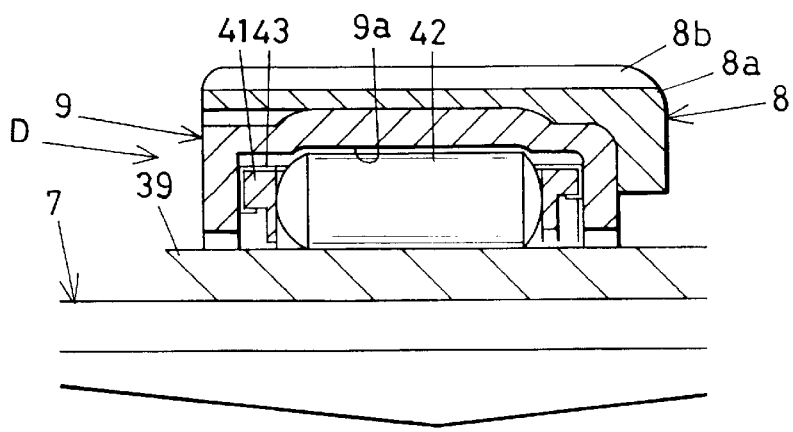
FIG. 4 is a cross sectional view showing a part of a one-way clutch mechanism of a rolling type.
Figure 5:
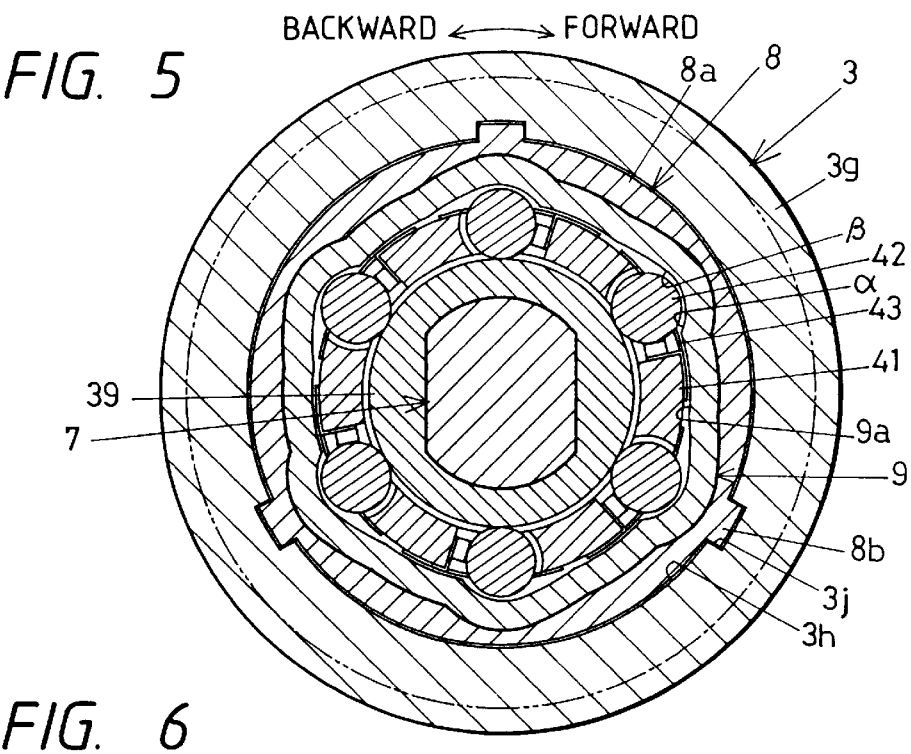
FIG. 5 is an enlarged, cross sectional view of the one-way clutch mechanism, taken on line F5—F5 in FIG. 3.
Figure 6:
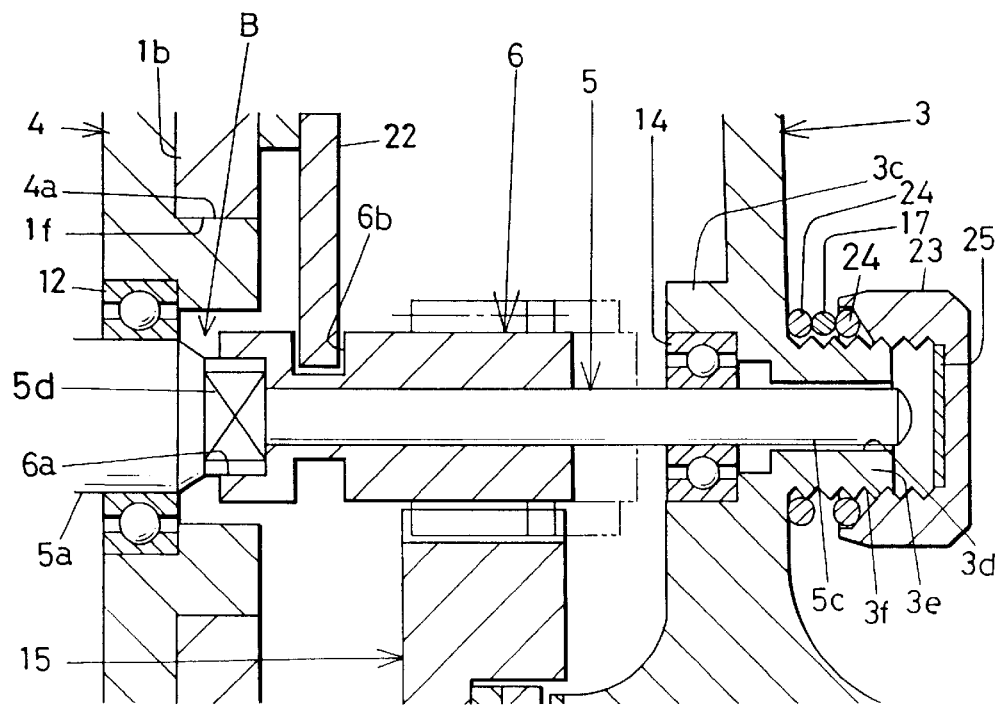
FIG. 6 is a cross sectional view showing a structure about a spool shaft, which is closer to the handle, in the double-bearing reel.

The present invention will be described in the embodiments of the invention with the accompanying drawings. In the description to be given with reference to the accompanying drawings, a fishing double-bearing reel will typically be described for a fishing reel. FIGS. 1 through 6 illustrate a first embodiment of the present invention. FIG. 1 is a plan view showing, partly in cross section, a major portion of a fishing double-bearing reel. FIG. 2 is an enlarged, cross sectional view showing a portion including a handle and its near structure in the fishing double-bearing reel. FIG. 3 is an enlarged, cross sectional view showing a structure including a handle drive shaft in the double-bearing reel. FIG. 4 is a cross sectional view showing a part of a one-way clutch mechanism of a rolling type. FIG. 5 is an enlarged, cross sectional view of the one-way clutch mechanism, taken on line F5—F5 in FIG. 3. FIG. 6 is a cross sectional view showing a structure about a spool shaft, which is closer to the handle, in the double-bearing reel.

A reel body A of a fishing reel is constructed by a side frame 1, a side plate 2 attached to an outside of a left frame 1a of the side frame, and a side plate 3 attached to an outside of a right frame 1b of the side frame.

The left and right frame 1a and 1b of the side frame 1 are held parallel to each other by a thumb rest plate 1c, supports (not shown), a reel-leg fixing plate 1d and another thumb rest plate 1e.

A thrust 10 and a bearing 11 are mounted on a tubular portion 2a formed in the side plate.

A tubular portion 4a of a spool cover 4 is fit into a through hole if of the right frame 1b, and a bearing 12 is mounted on the tubular portion 4a.

Between the left and right frames 1a and 1b, a spool 13 is fastened to a large-diameter portion 5a of a spool shaft 5. The large-diameter portion 5a of the spool shaft 5 at the right side (as viewed in the drawing) is supported by the bearding 12. A middle-diameter portion 5b of the spool shaft at the left side (as viewed in the drawing) is supported by the bearing 11 mounted on the side plate 2. A small-diameter portion 5b of the spool shaft at the right side is supported by a bearing 14 mounted on the side plate 3. The spool shaft 5 is rotated by rotating a handle 16 mounted on a handle drive gear 7 through a clutch mechanism B, a pinion 6 fit to the spool shaft 5, a rotary body (drive gear) 15 frictionally engaged with the handle. drive gear 7.

A fishing line 17 is wound around the spool 13, and guided to the right and left by a level winder C disposed between the left and right frame 1a and 1b in front of the spool 13.

The inside of the side plate 3 is formed as a gearbox and contains a clutch mechanism B.

The pinion 6 is mounted on the small-diameter portion 5c of the spool shaft 5 located between the right frame 1b and the side plate 3 so as to be axially movable thereon. An engaging part 5d of the spool shaft 5 and an engaging part 6a of the pinion 6 form an engaging part of the clutch mechanism B. The engaging part 5d and the engaging part 6a are adapted to be engaged and disengaged with each other by sliding the pinion 6 with respect to the spool shaft 5.

The pinion 6 meshes with the rotary body 15 rotatably mounted on the handle drive shaft 7.

A tubular portion 3a and a through hole 3b are formed inside the side frame 3 and in front of the spool shaft 5. A clutch cam body 18 is fit into the tubular portion 3a. A clutch handle 19 is firmly coupled to the outer part of the clutch cam body 18 by a screw 20.

A pin 18a formed on the clutch cam body 18 is communicated to a cam plate 21 so that the cam plate 21 is vertically slidable by operation of the clutch handle 19.

An angle cam 21a is formed on the cam plate 21.

A groove 6b is formed in the circumferential outer surface of the pinion 6. A clutch plate 22 urged inwardly in the axial direction (left direction in the drawings) of the spool shaft 5 is inserted thereinto. The clutch plate 22 is moved in the axial direction by the angle cam 21a to turn on and off the engaging part of the clutch mechanism B.

A tubular portion 3c and a through hole 3d are formed inside the side plate 3. The bearing 14, which supports the small-diameter portion 5c of the spool shaft 5, is mounted on the tubular portion 3c. A tubular portion 3e coaxially with the tubular portion 3e is formed on the outside of the side frame 3. A screw portion 3f, into which an adjusting knob 23 is screwed, is formed at the circumferential outer surface of the tubular portion 3e.

Two O rings 24 are fit to the outer surface of the screw portion 3f. One of the O rings 24 is preferably put within the adjusting knob 23.

A thrust plate 25 is mounted within the adjusting knob 23 such that the top end of the small-diameter portion 5c is brought into contact with it.

When the adjusting knob 23 is tightened up, the spool shaft 5 is pushed forward, and the small-diameter portion 5b at the left end of the spool shaft is pressed against a thrust plate 10 mounted within the tubular portion 2a of the side plate 2, thereby effecting the braking.

When the adjusting knob 23 is loosened, the fishing line 17 may be put between the O rings 24.

When the two O rings 24 are fit to the outer surface of the screw portion 3f, the holding torque of the adjusting knob 23 is increased, so that the adjusting knob is prevented from being accidentally loosened.

Further, the fishing line 17 may be held fast when the reel is not in use, and it serves as a fishing line gripping device which firmly holds the fishing line even under mistaken operations.

Since the adjusting knob 23 is loosened and the O rings 24 are exposed to the outside when the fishing line gripping device is used, plastic deformation of the component parts occurs due to the fishing line gripping device being left in the tightened condition.

With use of the two O rings 24, the inside of the adjusting knob 23 is protected against water. Further, the metal (bronze) is isolated from the outside. This eliminates the necessity of taking measures for the improvement of corrosion-proof and outward appearance.

A recess 1g, in which a bearing 26 is fit, is formed in the right surface of the right frame 1b. The bearing 26 rotatably supports the left end 7a of the handle drive shaft 7, and is rotatably held by an anti-coming-off plate 27 for preventing the drive shaft 7 from coming off.

A concave portion 3h and a through hole 3i are formed in a support portion 3g of the side frame 3.

A plurality of grooves 3j axially extended are formed in the inner wall of the concave portion 3h. A plurality of protrusions 8b, which are formed on the circumferential outer surface of a tubular portion 8a of a collar 8, are fit to the grooves 3j. The collar 8 is fit to the support portion 3g in a state that it is axially movable but it is locked in its rotation.

Gaps "a" and "b" are provided within the concave portion 3h, while being positioned a distance apart in the axial direction of the collar 8. A washer 28 and an elastic ring 29 made of felt or soft rubber are placed within the gap a An elastic ring 30 made of felt or soft rubber is placed also within the gap "b". The opening of the concave portion 3h is closed with a cover plate 32 mounted thereon by screws 31. A bearing 33 is fit to a through hole 3i.

The handle drive shaft 7 is supported with the bearing 33 through a collar 34 which is fit to the handle drive shaft 7 such that it is movable in the axial direction of the handle drive shaft but it is locked in its rotation about the shaft.

The handle drive shaft 7 includes the left end 7a, a small-diameter part 7b, a collar part 7c, a shaft part 7d having a cross section in which as shown in FIG. 5, opposite sides of the circle in the cross section is cut off to form an approximately oval shape, a screw part 7e formed at one end of the shaft part 7d, a small-diameter part 7f having a cross section in which as shown in FIG. 5, opposite sides of the circle in the cross section is cut off to form an approximately oval shape, and a screw part 7g formed in the outer surface of the small-diameter part 7f. A washer 35, a friction plate 36, the rotary body 15, friction plate 37, a brake plate 38 and an inner ring 39 are fit to the right portion (as viewed in FIG. 2) of the collar part 7c. An adjusting member 40 is screw coupled to the screw part 7e.

The brake plate 38 and the inner ring 39 are fit.to the handle drive shaft 7 while being locked in its rotation about the shaft.

The friction plate 37 and the brake plate 38 are placed within a recess 15a of the rotary body 15.

An outer ring 9 of a rolling type one-way clutch D is inserted, by press-fitting or the like, to the tubular portion 8a of the collar 8 to form a one-piece construction.

The one-way clutch D is constructed as shown in FIG. 5. A holder 41 is located within the outer ring 9. A bar-like rolling member 42 taking a wedging action and a spring 43 are located within each of a plurality of holes of the holder 41.

The inner surface 9a of the outer ring 9 includes a free rotation area α and a stopping surface β. The free rotation area a is shaped to be concave and allows the bar-like rolling member 42 to rotate thereon. The stopping surface β stops the rotation of the bar-like rolling member 42 when it is brought into contact therewith.

An operation of the fishing reel will be described. In an on state of the clutch mechanism B in which the engaging part 5d of the spool shaft 5 engages the engaging part 6a of the pinion 6, the handle 16 is rotated in a direction in which the fishing line 17 is wound around the spool 13. Then, the fishing line 17 is wound around the spool 13 through the handle drive shaft 7, the rotary body 15, the pinion 6 and the spool shaft 5.

At this time, when the handle drive shaft 7 is rotated in a forward direction or a clockwise direction in FIG. 5, the bar-like rolling member 42 of the one-way clutch D rolls to the free rotation area α. In this area, the rolling member is placed in an inoperative state in which it takes no wedging action, and the handle drive shaft 7 is allowed to rotate in the clockwise or forward direction.

Subsequently, when the fishing line 17 is played out and the spool 13 is reversely rotated, then the spool shaft 5 is reversely rotated and the bar-like rolling member 42 of the one-way clutch D rolls to the stopping surface β, and it is placed to an operative state in which it takes a wedging action. The handle drive shaft 7 is locked in its rotation to the counterclockwise direction in FIG. 5, and it is placed to a locked state in which its reverse rotation is prohibited.

When the adjusting member 40 is rotated in a releasing direction in a state that the one-way clutch D prohibits the handle drive shaft 7 from rotating in a counterclockwise direction so that the reverse rotation of the handle drive shaft is prohibited, since the collar 8 with which the one-way clutch D is coupled is axially movable into the support portion 3g of the side plate 3 and held with the elastic rings 29 and 30, the collar 34 and the inner ring 39 move following up a slight axial movement of the one-way clutch D corresponding to the axial movement of the adjusting member 40 by weakened operation thereof. Therefore, a force of the inner ring 39 pressing the brake plate 38, the friction plate 37, the rotary body 15, and the friction plate 36, is weakened, and hence the braking force is weakened.

Where the braking force is weakened, the backlash referred to in the background art description does not occur if the handle 16 is forwardly rotated and the locking state is removed.

The fishing reel of the invention is constructed as described above. Accordingly, when an angler fights with a fish with playing out the fishing line 17 with applying the spool braking force to the spool 13, an angler can adjust the spool braking force to cope with a momently changing fishing situation since the axial movement of the one-way clutch is allowed by forming the play at opposite sides thereof, even if the one-way clutch D prohibits the handle drive shaft 7 from rotating i.e. even if the bar-like rolling members 42 of the one-way clutch D forming a reverse rotation preventing device, and the inner ring 39 on the handle drive shaft 7 are locked by the load of the reverse rotation and the wedging action. Therefore, the prevention of caused by improper spool braking force adjustment which occurs during the actual fishing is secured.

Figure 7:
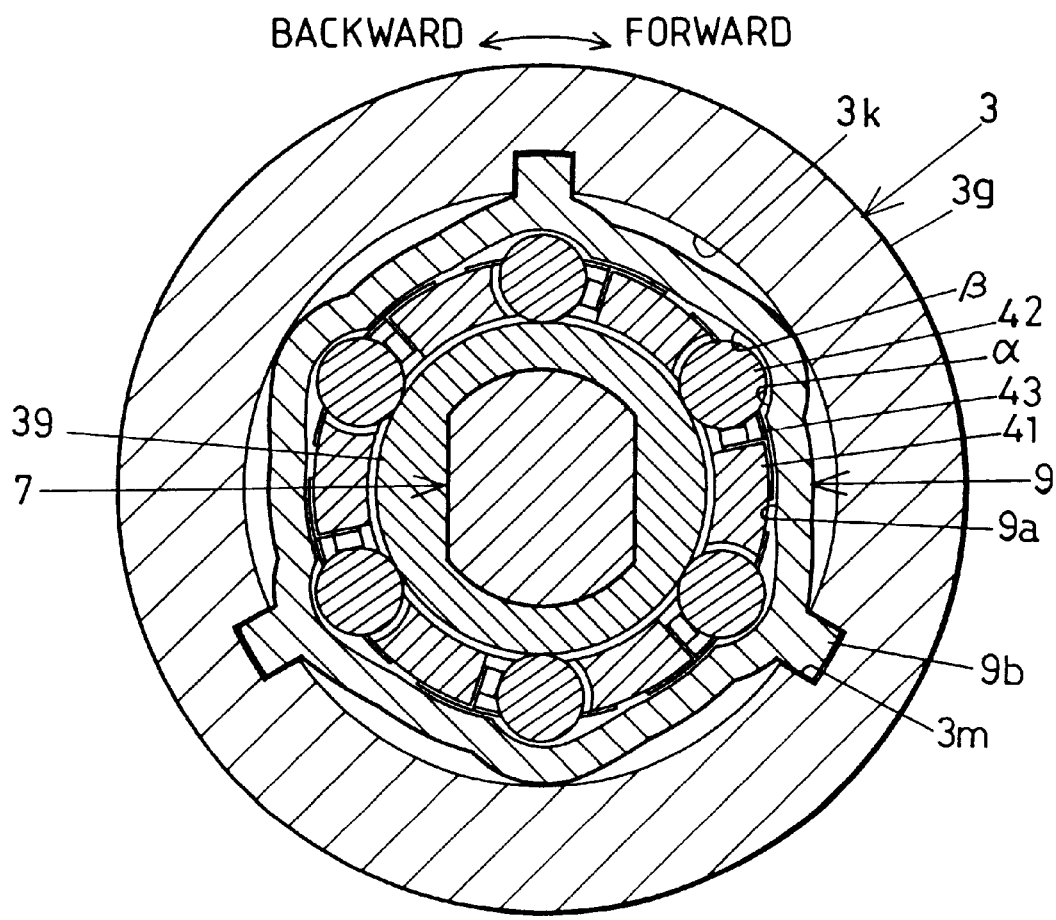
FIG. 7 is an enlarged, cross sectional view showing a one-way clutch of a rolling type, which forms a second embodiment of the present invention.

FIG. 7 is an enlarged, cross sectional view showing a one-way clutch of a rolling type, which forms a second embodiment of the present invention.

In the second embodiment, a recess 3k and a plurality of axially extending grooves 3m are formed in the support portion 3g of the side frame 3. A rolling type one-way clutch D is inserted in the recess 3k. A plurality of protrusions 9b protruded from the outer circumference of an outer ring 9 are respectively inserted in the grooves 3m in a state that those protrusions are movable in the axial direction and are locked in its rotation.

The collar 8 used in the first embodiment is not used in the second embodiment.

In the second embodiment, the outer ring 9 per se, as one of the components forming the one-way clutch D, is directly moved in the axial direction.

The remaining construction of the second embodiment is substantially the same as of the first embodiment.

Figure 8:
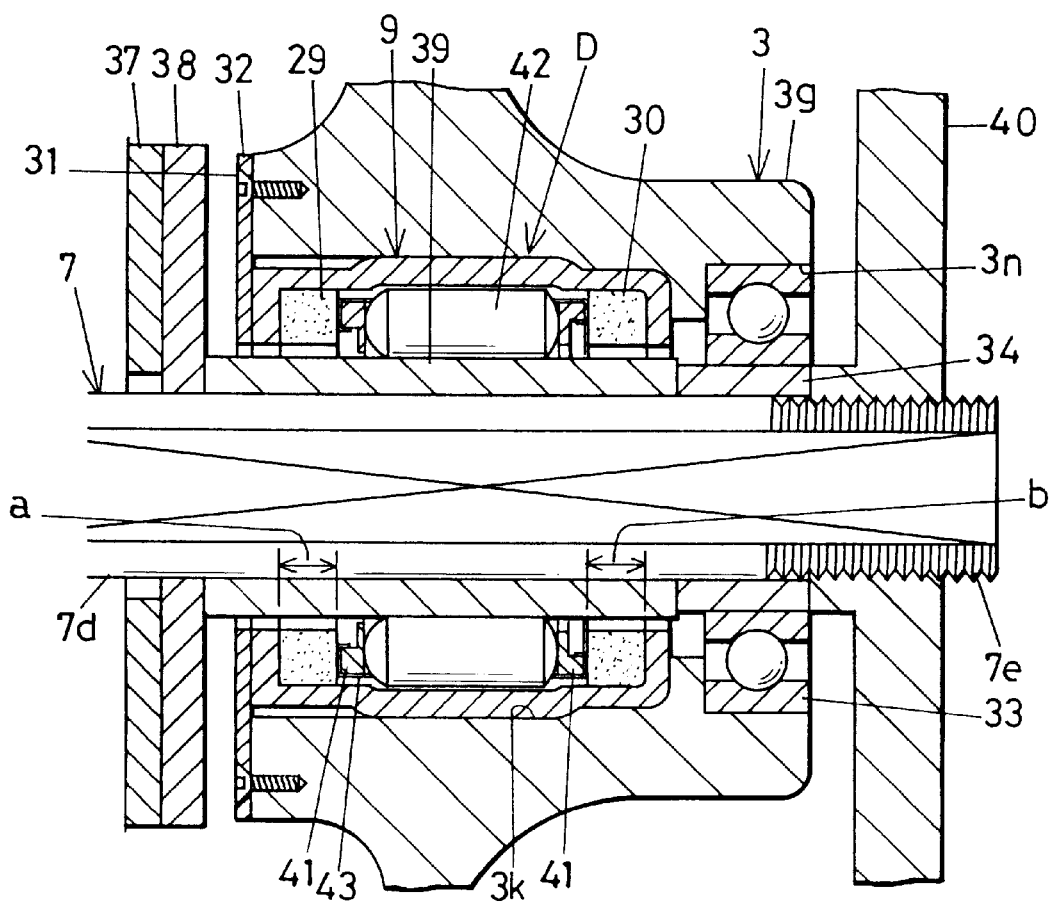
FIG. 8 is an enlarged, cross sectional view showing a structure including a handle drive shaft, which forms a third embodiment of the present invention.

FIG. 8 is an enlarged, cross sectional view showing a structure including a handle drive shaft of a third embodiment of the present invention.

In the third embodiment, a recess 3k and another recess 3n are formed in the support portion 3g of the side frame 3 as in the second embodiment. A rolling type one-way clutch D is inserted into the recess 3k, the outer ring 9 is fixed, and a bearing 33 is mounted within the recess 3n.

A holder 41 for the one-way clutch D is mounted within the outer ring 9. Bar-like rolling members 42 each taking a wedging action and springs 43 are located respectively within a plurality of holes of the holder 41. Gaps "a" and "b" are provided at opposite ends of the holder 41 as viewed in the axial direction. An elastic ring 29 made of felt or soft rubber is placed in the gap "a", and an elastic ring 30 made of felt or soft rubber is placed in the gap "b".

The holder 41, the bar-like rolling member 42 and the spring 43 are axially movable within the holder.

In the third embodiment, the holder 41, the bar-like rolling member 42 and the spring 43, which are components forming the one-way clutch D, are axially movable.

The remaining construction of the second embodiment is substantially the same as of the first embodiment.

Figure 9:
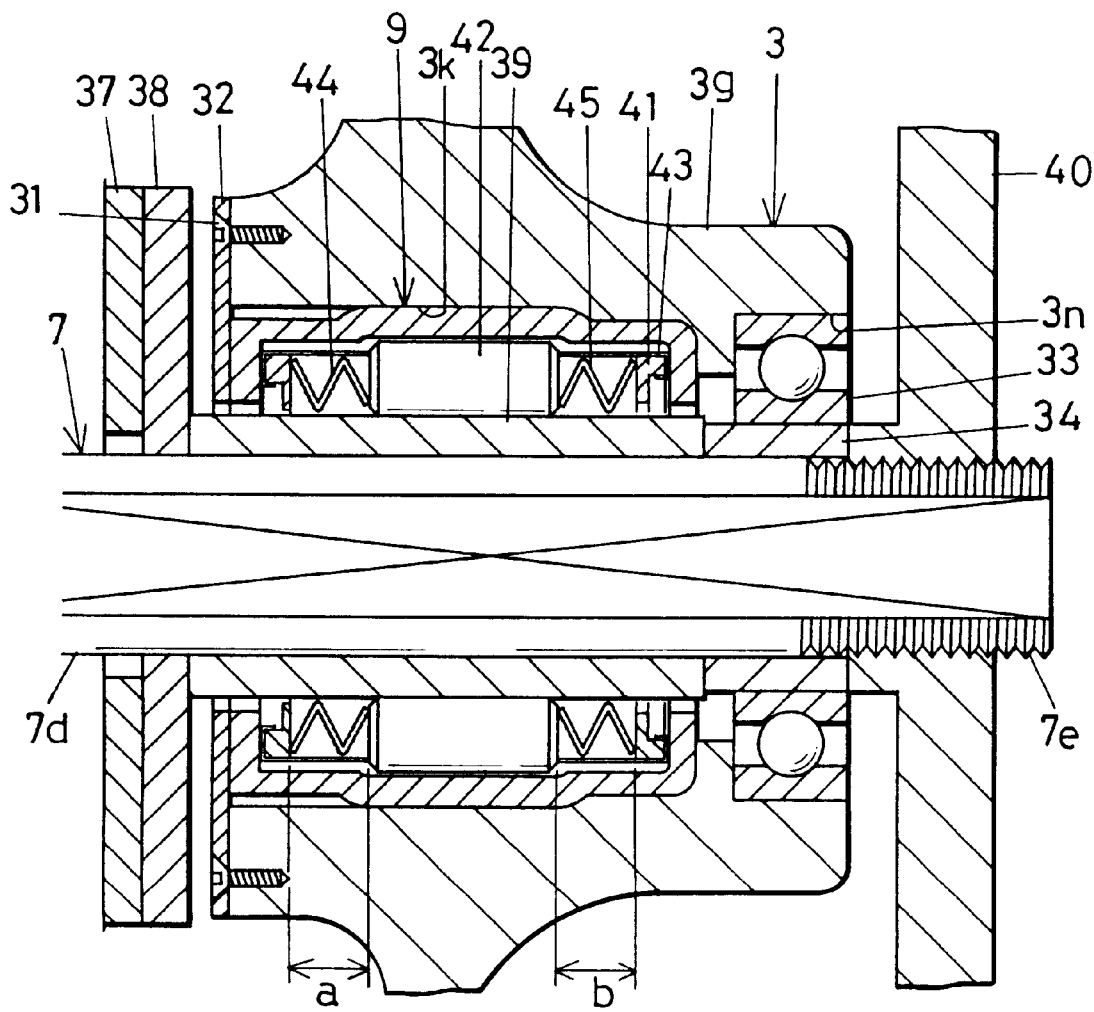
FIG. 9 is an enlarged, cross sectional view showing a structure including a handle drive shaft, which forms a fourth embodiment of the present invention.

FIG. 9 is an enlarged, cross sectional view showing a structure including a handle drive shaft of a fourth embodiment of the present invention.

In the fourth embodiment, a recess 3k is formed in the support portion 3g of the side frame 3, and a rolling type one-way clutch D is inserted into the recess 3k. An outer ring 9 is fixed.

A holder 41 for the one-way clutch D is mounted within the outer ring 9. Bar-like rolling members 42 each taking a wedging action and springs 43 are located respectively within a plurality of holes of the holder 41. Gaps "a" and "b" are provided between the holder 41 and the bar-like rolling members 42. Springs 44 and 45 are located within the gaps "a" and "b".

In the fourth embodiment, the bar-like rolling members 42, which are components forming the one-way clutch D, are axially movable.

The remaining construction of the second embodiment is substantially the same as of the first embodiment.

In the above-mentioned embodiments, the rotary body (drive gear) is frictionally engaged with the handle drive shaft which is rotated interlocking with the handle. In an alternative, a friction coupling force of the rotary body which is frictionally coupled with another drive shaft is adjusted in magnitude with a rolling type one-way clutch D intervening in the force transmission path.

The adjustment of the braking force may be carried out through the reverse procedure when comparing with each above-mentioned embodiment in which under the load by the reverse rotation, the braking force effected on the spool is changed from a weak braking state to a strong braking state. Also in the alteration, the braking operation is adjusted while free from its locking because of a freedom of the movement resulting from the axial movement of the one-way clutch D.

While in the above-mentioned embodiments, the fishing double-bearing reel is discussed for the fishing reel, it is evident that the present invention may be applied to another reel which is different from the above-mentioned one.

Figure 10:
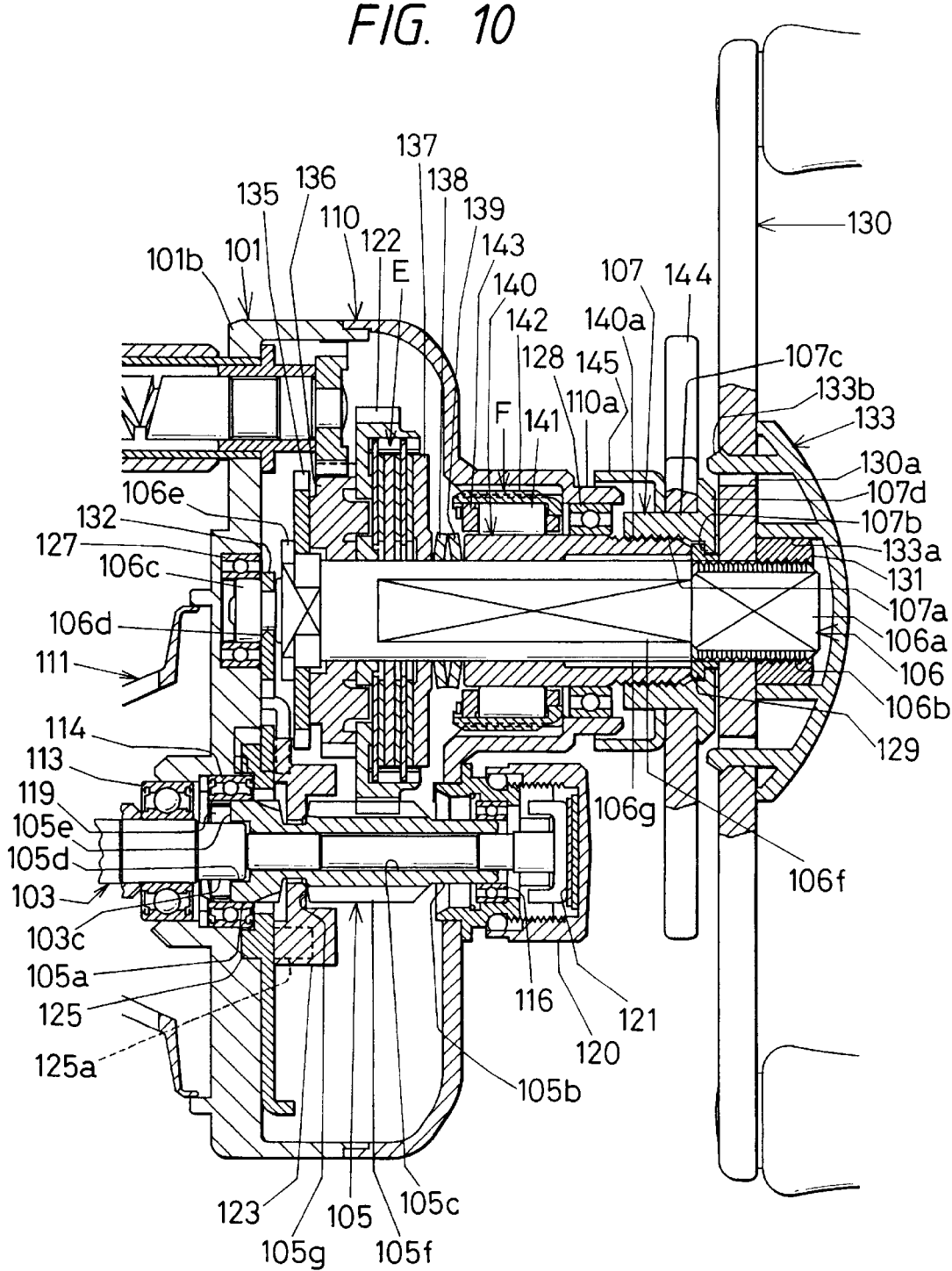
FIG. 10 is an enlarged, cross sectional view showing a portion including a handle and its near structure in the fishing. double-bearing reel of a fifth embodiment of the present invention.

FIG. 10 is an enlarged, cross sectional view showing a portion including a handle and its near structure in the fishing double-bearing reel of a fifth embodiment.

A handle shaft 106 is supported with a bearing 127 formed in a right side frame 101b and a bearing 128 formed in a right side plate 110. A rotation-stopper portion 106a and a screw portion 106b are formed at the circumferential outer surface of right side of the handle shaft 106. A collar 129 having a L-shape in cross section and a handle 130 are fit to the rotation-stopper portion 106a. A nut 131 is screwed on the screwed portion 106b.

The bearing 127 inserted into the recess portion of the right side frame 1b is prevented from coming off by an anti-coming-off plate 132.

A rotation-stopper part 133a of a nut cover 133 prevents the nut 131 from rotating. Engagement portions 133b of the nut cover 133 are respectively inserted into and engaged with engagement holes 130a of the handle 130.

The handle shaft 106 includes a large-diameter portion 106c to be fit to the bearing 127, a small-diameter portion 106c, a collar 106e and a small-diameter portion 106g having a rotation-stopper portion 106f having a cross section in which opposite sides of the circle in the cross section is cut off to form an approximately oval shape.

One end of the small-diameter portion 106c is brought into contact with the thrust bearing.

A ratchet wheel 135, a gear 136, a drive gear 122, a pressing plate 137, spring plates 138, 139, and a tubular drag pressing portion 140 are fit to the circumferential outer surface of the rotation-stopper portion 106f. The ratchet wheel 135, the pressing plate 137 and the tubular drag pressing portion 140 are fit to the handle shaft 106 and locked in its rotation with respect to the handle shaft 106.

A friction braking member E is held between the drive gear 122 and the pressing plate 137, thereby forming a drag braking mechanism.

A plurality of bar-like rolling members 141 of a rolling type one-way clutch F and a bearing 128 are placed on the circumferential outer surface of the tubular drag pressing portion 140.

The gear 136 is in mesh with the drive gear 122.

The one-way clutch C is supported with in a tubular portion 110a of the side plate 110.

The handle 130 is rotatable in a direction in which a fishing line (not shown) is wound on a spool 111, by the one-way clutch F. And its rotation in the reverse direction is prohibited.

In the one-way clutch F, a holder 143 is mounted within the outer ring 142, and includes a plurality of holes. One bar-like rolling member 141 taking a wedging action and a spring (not shown) are placed in each hole.

The inner surface of the outer ring 142 includes a free rotation area (not shown) and a stopping surface. The free rotation area is shaped to be concave and allows the bar-like rolling member 141 to rotate thereon. The stopping surface stops the rotation of the bar-like rolling member 141 when it is brought into contact therewith.

A screw part 140a which is screw coupled to a 107a of a drag operation portion 107 is formed in the outer surface of the tubular drag pressing portion 140 at a location closer to the handle. A drag adjusting knob 144 is fast fit to the circumferential outer surface of the drag operation portion 107.

The drag operation portion 107 is tubular in shape. The threaded part 107a and the small-diameter part 107b are formed in the inner wall of the drag operation portion 107.

A cover 145 is fixed to the outer surface of the drag operation portion 107 located in front of the drag adjusting knob 144.

A spool shaft 103 comprises a large-diameter portion, to which the spool 111 is mounted and which is supported with a bearing 113, and a small-diameter portion 103c coaxially extending from the large-diameter portion.

A pinion 105 comprises: a large-diameter tubular portion 105a supported with a bearing 114; a small-diameter tubular portion 105b supported with a bearing 116; a hole portion 105c; a large-diameter hole portion 105d; an engagement groove 105e formed in the one end of the large-diameter tubular portion 105a, which is engageable with a engagement projection pin 119 fixed to the small-diameter portion 103c; a pinion gear 105f formed in a circumferential outer surface of the small-diameter tubular portion 105b, which is engaged with the drive gear 122; and a groove portion.105g formed between the large-diameter. tubular portion 105a and the small-diameter tubular portion 105b.

A pressing bar 117 is inserted through the hole .portion 105c. One end of the pressing bar 117 is abutted to the on end of the small-diameter portion 103c. The other end of the pressing bar 117 is abutted to a thrust bearing 121 provided within a pressing knob 120.

An operation portion 123 constructing a clutch mechanism is engaged with the groove 105g of the pinion 105 for sliding the pinion 105 in the axial direction, thereby engaging and disengaging the pinion 105 with the spool shaft 103. A clutch operation ring 125 is provided at the right side frame 101b to control the operation portion 123 through cam 125a formed in the clutch operation ring 125.

An operation of the fishing double bearing reel of the fifth embodiment will be described. In an ON state of the clutch in the clutch mechanism in which the engaging protrusion 119 of the spool shaft 103 engages the engagement groove 105e of the pinion 105, the handle 130 is rotated in a direction in which the line is wound on the spool 111. With rotation of the handle, the line is wound on the spool 111, through the handle shaft 106, the drive gear 122, the pinion 105 and the spool shaft 103.

When the handle shaft 106 is forwardly rotated, the bar-like rolling members 141 of the one-way clutch F move to the free rotation area. In this area, the rolling member is placed-in an inoperative state in which it takes no wedging action, and the handle shaft 106 is allowed to rotate in the clockwise or forward direction.

Subsequently, when the fishing line is played out and the spool 111 is reversely rotated, then the spool shaft 106 is reversely rotated and the bar-like rolling member 141 of the one-way clutch C rolls to the. stopping surface, and it is placed to an operative state in which it takes a wedging action. The handle shaft 106 is locked in its rotation to the reverse direction, and it is placed to a locked state.

When a drag braking force of the drive gear 122, which is friction coupled to the handle shaft 106 by the friction braking member E, is controlled in magnitude, the drag operation portion 107 is rotated and the tubular drag pressing portion 140 is moved forward an d backward.

At this time, since the drag operation portion 107 is abutted to a step between the rotation-stopper portion 106a and the rotation-stopper portion 106f of the handle shaft 106f through the collar 129, the drag operation portion 107 is not moved with respect to the handle shaft in the axial direction.

Accordingly, a gap between the handle 130 and the drag operation portion 107 remains as preset. The small-diameter portion 106g of the handle shaft 106 has no screwed portion, and the screwed-part 106b is covered with and-hidden by the drag operation portion 107.

Since the small-diameter portion 106g of the handle shaft 106 has no screwed portion, the tubular drag pressing portion 140 moves forward and backward without any interruption.

In the fishing dual-bearing reel thus constructed, the drag operation portion 107 is made immovable in the axial direction of the handle. The screwed portion is not exposed to outside, and no dust will enter the threaded part. Accordingly, there is no chance of improper operation of the drag operation portion 107 caused by the dust entered.

Since the screwed portion is out of sight, an outward appearance (beauty) of it is not damaged.

The tubular drag pressing portion 140 can reliably be moved forward and backward by operating the drag operation portion 107. Therefore, even when the reverse rotation preventing device is operating in an actual fishing, there is no fear that the dragging is lessened by the interference with the one-way clutch F.

Further, the number of required component parts is reduced when comparing with the conventional drag mechanism. Therefore, the drag mechanism of the invention is simplified in structure, the assembling work it is easy, the cost to manufacture is reduced, and suffers from less chance of trouble occurrence.

The present invention may be implemented as described above, and has the following effects.

The fishing reel of the invention is constructed as described above. Accordingly, when to fight with a fish, an angler plays out the line while braking the spool, even if, under the reverse rotation load during the playing out of the fishing line, the angler adjusts the spool braking force to cope with a momently changing fighting situation, and the bar-like rolling member of the one-way clutch, which forms reverse rotation preventing means, and the inner ring on the handle drive shaft are locked by the load and the wedging action during the reverse rotation, the braking operation is adjusted while free from its locking because of a freedom of the movement resulting from the axial movement of the one-way clutch, and prevention of a trouble caused by improper spool braking force adjustment, which will occur during the actual fishing, is secured.

The drag operation portion is made immovable in the axial direction of the handle. The threaded portion is not exposed to outside, and no dust will enter the threaded part.

Accordingly, there is no chance of improper operation of the drag operation portion caused by the dust entered.

Since the threaded portion is out of sight, an outward appearance (beauty) of it is not damaged.

The tubular drag pressing portion can reliably be moved forward and backward by operating the drag operation portion. Therefore, even when the reverse rotation preventing device is operating in an actual fishing; there is no fear that the dragging is lessened by the interference with the one-way clutch.

Further, the number of required component parts is reduced when comparing with the conventional drag mechanism. Therefore, the drag mechanism of the invention is simplified in structure, the assembling work it is easy, the cost to manufacture is reduced, and suffers from less chance of trouble occurrence.

The number of required parts is reduced when the tubular drag pressing portion is also used as the inner ring of the one-way clutch.

What is claimed is:

1. A fishing reel comprising:
   a reel body;
   a driving shaft which is rotatably supported with the reel body and is rotated by a rotation of a handle;
   a rotary body frictionally coupled to one end of the driving shaft, the rotary body being rotated when a fishing line is played out;
   an adjusting member, for adjusting a friction coupling force of the rotary body in magnitude, mounted on the other end of the driving shaft, the adjusting member being axially movable with respect to the driving shaft; and
   a rolling type one-way clutch, for preventing the driving shaft from rotating in a reverse direction, provided at a portion of the driving shaft between the rotary body and the adjusting member, the rolling type one-way clutch including,
      an inner ring rotatable together with and slidable along the driving shaft, the inner ring being brought into contact with at least one rolling member of the rolling type one-way clutch, wherein the friction coupling force of the rotary body is adjustable by sliding the inner ring along the driving shaft,
      an outer ring fit to a support portion of the reel body so that the outer ring is locked in its rotation so that the at least one rolling member is between the inner ring and the outer ring, and
      a gap for allowing a movement of at least one part of the rolling type one-way clutch in the axial direction,
   wherein the gap is provided between the outer ring and the support portion.

2. The fishing reel according to claim 1, wherein an elastic ring made of any one of felt or soft rubber is inserted into the gap.

3. The fishing reel according to claim 1, wherein a second gap is provided between the outer ring and the at least one rolling member.

4. The fishing reel according to claim 3, wherein an elastic ring made of any one of felt or soft rubber is inserted into the second gap.

5. The fishing reel according to claim 3, wherein a spring is inserted into the gap.

6. The fishing reel according to claim 1, wherein a plurality of gaps are provided at opposite sides of the rolling type one-way clutch.

7. A fishing reel comprising:
   a reel body;
   a spool for holding a fishing line wound thereon rotatably supported between side plates of the reel body;
   a handle rotatably supported with the reel body;
   a handle shaft rotating with the handle rotatably supported with the reel body;
   a take-up drive mechanism which transmits a rotating operation of the handle to the spool for winding the fishing line thereon;
   a drag mechanism, for allowing the spool to rotate in a direction of playing out the fishing line with a dragging force in a fishing line take-up state, provided between the spool and the handle;
   an operating portion rotatably supported with the handle shaft so that a movement to an axial direction of the operating portion is prohibited; and
   a drag pressing portion coupled to the operating portion,
   wherein the dragging force of the drag mechanism is adjusted by moving forward and backward the drag pressing portion in accordance with a quantity of operation of the operating portion,
   wherein a gap is formed between the drag pressing portion and the drag mechanism for allowing movement of the drag pressing portion.

8. The fishing reel according to claim 7 further comprising a one-way clutch provided on the handle shaft.

9. The fishing reel according to claim 8, wherein the drag pressing portion serves as an inner ring of the one-way clutch.

10. The fishing reel according to claim 7, wherein the drag pressing portion is in a tubular shape into which the handle shaft is inserted.

11. The fishing reel according to claim 7, wherein the drag mechanism is coupled to one end of the handle shaft, the handle and the operating portion are coupled to the other end of the handle shaft.

12. The fishing reel according to claim 7, wherein a distance between the handle and the operating portion in the axial direction is constant when the operating portion is operated for adjusting the dragging force.

13. A fishing reel comprising:

a reel body;

a driving shaft which is rotatably supported with the reel body and is rotated by a rotation of a handle;

a rotary body frictionally coupled to one end of the driving shaft, the rotary body being rotated when a fishing line is played out;

an adjusting member, for adjusting a friction coupling force of the rotary body in magnitude, mounted on the other end of the driving shaft, the adjusting member being axially movable with respect to the driving shaft; and a rolling type one-way clutch, for preventing the driving shaft from rotating in a reverse direction, provided at a portion of the driving shaft between the rotary body and the adjusting member, the rolling type one-way clutch including, an inner ring rotatable together with and slidable along the driving shaft, the inner ring being brought into contact with at least one rolling member of the rolling type one-way clutch, wherein the friction coupling force of the rotary body is adjustable by sliding the inner ring along the driving shaft, and an outer ring fit to a support portion of the reel body so that the outer ring is locked in its rotation so that the at least one rolling member is between the inner ring and the outer ring, wherein an outer surface of the outer ring includes protrusions which are engaged within grooves of an inner surface of the support portion, so that said outer ring and said support portion are rotatably locked together.

14. A fishing reel comprising:

a reel body;

a driving shaft which is rotatably supported with the reel body and is rotated by a rotation of a handle;

a rotary body frictionally coupled to one end of the driving shaft, the rotary body being rotated when a fishing line is played out;

an adjusting member, for adjusting a friction coupling force of the rotary body in magnitude, mounted on the other end of the driving shaft, the adjusting member being axially movable with respect to the driving shaft; and a rolling type one-way clutch, for preventing the driving shaft from rotating in a reverse direction, provided at a portion of the driving shaft between the rotary body and the adjusting member, the rolling type one-way clutch including, an inner ring rotatable together with and slidable along the driving shaft, the inner ring being brought into contact with at least one rolling member of the rolling type one-way clutch, wherein the friction coupling force of the rotary body is adjustable by sliding the inner ring along the driving shaft, an outer ring fit to a support portion of the reel body so that the outer ring is locked in its rotation so that the at least one rolling member is between the inner ring and the outer ring, and gaps for allowing a movement of at least one part of the rolling type one-way clutch in the axial direction, wherein the gaps are provided at opposite sides of the rolling type one-way clutch, respectively.

* * * * *